United States Patent
Baumann et al.

(10) Patent No.: US 7,588,128 B2
(45) Date of Patent: Sep. 15, 2009

(54) SELF-BOOSTING ELECTROMECHANICAL VEHICLE BRAKE

(75) Inventors: Dietmar Baumann, Hemmingen (DE);
Dirk Hofmann, Ludwigsburg (DE);
Herbert Vollert, Vaihingen/Enz (DE);
Willi Nagel, Remseck/Hochdorf (DE);
Andreas Henke, Diemelstadt (DE);
Bertram Foitzik, Ludwigsburg (DE);
Bernd Goetzelmann, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 352 days.

(21) Appl. No.: 10/581,414

(22) PCT Filed: Nov. 18, 2004

(86) PCT No.: PCT/DE2004/002541

§ 371 (c)(1),
(2), (4) Date: Jun. 2, 2006

(87) PCT Pub. No.: WO2005/057041

PCT Pub. Date: Jun. 23, 2005

(65) Prior Publication Data

US 2008/0190717 A1 Aug. 14, 2008

(30) Foreign Application Priority Data

Dec. 5, 2003 (DE) ................. 103 56 936

(51) Int. Cl.
*F16D 55/08* (2006.01)

(52) U.S. Cl. .................. 188/72.7; 188/368; 188/162
(58) Field of Classification Search ................ 188/72.7, 188/72.2, 368, 161, 162, 70 B
See application file for complete search history.

(56) References Cited

U.S. PATENT DOCUMENTS

| 3,900,083 | A | * | 8/1975 | Hauth ........................ 188/72.2 |
| 6,305,506 | B1 | | 10/2001 | Shirai et al. |
| 6,318,513 | B1 | * | 11/2001 | Dietrich et al. ............. 188/72.7 |
| 6,752,247 | B2 | * | 6/2004 | Hartsock ................... 188/72.7 |

FOREIGN PATENT DOCUMENTS

| DE | 35 00 783 A1 | 7/1986 |
| DE | 101 51 950 A1 | 5/2003 |

* cited by examiner

*Primary Examiner*—Melanie Torres
(74) *Attorney, Agent, or Firm*—Ronald E. Greigg

(57) ABSTRACT

A self-boosting electromagnetic disk brake having an electromechanical actuating device and a mechanical self-boosting device that has a wedge mechanism. A wedge is displaceable parallel to a brake disk and relative to a friction brake lining, and the relative displaceability of the wedge is limited relative to the friction brake lining to one direction, by means of a slaving device. The wedge is decoupled from the friction brake lining in one direction of rotation of the brake disk. As a result, the self-boosting device is operative in only one direction of rotation of the brake disk; in the reverse direction of rotation of the brake disk, the disk brake is neutral in terms of self-help.

7 Claims, 3 Drawing Sheets

SELF-BOOSTING ELECTROMECHANICAL VEHICLE BRAKE

CROSS-REFERENCE TO RELATED APPLICATIONS

This application is a 35 USC 371 application of PCT/DE 2004/002541 filed on Nov. 18, 2004.

BACKGROUND OF THE INVENTION

1. Field of the Invention

The present invention relates to a self-boosting electromechanical vehicle brake including disc brakes and other types of brakes intended for use particularly in motor vehicles.

1. Description of the Prior Art

One vehicle brake known from German Patent Disclosure DE 101 51 950 A1 is embodied as a disk brake. This known vehicle brake has an electric motor and a spindle drive as its electromechanical actuating device for pressing a friction brake lining against a brake disk for generating a brake force. The brake disk forms a brake body for the vehicle brake. A step-down gear may be connected between the electric motor and the spindle drive. The spindle drive forms a rotation/translation speed-changing gear. In addition, for pressing the friction brake lining against the brake body, still other rotation/translation speed-changing gears are possible, such as a rotatable cam. It is also conceivable for example to replace the electric motor with an electromagnet.

As its self-boosting device, the known vehicle brake has a wedge mechanism, with a wedge that is located on the back side, facing away from the brake disk, of the friction brake lining. The wedge is braced on an abutment that extends at a wedge angle obliquely to the brake disk in the direction of rotation of the brake disk. Between the abutment and the brake disk, there is a wedge gap that narrows in one direction of rotation of the brake disk. The wedge need not be a wedge in the strictest sense; it may also be a non-wedge-shaped element that, together with the abutment, generates a wedge effect.

For braking, the friction brake lining is pressed by the electromechanical actuating device against the brake disk that forms the brake body. The friction brake lining may be displaced either transversely or obliquely at a wedge angle or some other angle. The rotating brake disk exerts a frictional force, in the direction of the narrowing wedge gap between the abutment and the brake disk, on the friction brake lining that is pressing against it for braking; this frictional force, via a wedge effect of the wedge braced on the abutment, generates a reaction force that has a force component transversely to the brake disk. This force component is a contact pressure which, in addition to the contact pressure exerted by the actuating device, presses the friction brake lining against the brake disk. The contact pressure and the braking force are increased as a result. The self-boosting device converts the frictional force, exerted by the rotating brake disk on the friction brake lining pressed against it, into an additional contact pressure. The self-boosting is operative only for one direction of rotation of the brake disk. A displacement of the friction brake lining should be effected on a curved path whose center is approximately on an imaginary axis of rotation of the brake disk, or on a straight path in the secant direction to the brake disk. For attaining the self-boosting action, the frictional force exerted by the rotating brake disk on the friction brake lining must act upon the friction brake lining in the direction of the narrowing wedge gap between the abutment and the brake disk.

Instead of a wedge mechanism, a ramp mechanism which has a curved course for instance instead of a straight course may be used. For rapidly overcoming an air gap between the brake disk and the friction brake lining at the onset of a braking event, the ramp mechanism initially forms a large angle to the brake disk. At high contact and braking forces, the ramp angle may be selected as an acute angle, to achieve a high self-boosting factor.

SUMMARY AND ADVANTAGES OF THE INVENTION

In the vehicle brake of the invention, the wedge is not fixedly connected to the friction brake lining; instead, the wedge and the friction brake lining are movable counter to one another. A slaving device has the effect that the wedge rotates with the friction brake lining in the one direction of rotation of the brake body, in which the self-boosting device is operative. As a result, the self-boosting action as explained above in terms of the prior art is attained. In the opposite direction of rotation of the brake body, the friction brake lining is displaceable relative to the wedge. As a result, self-fading of the vehicle brake does not occur; instead, the friction brake lining is pressed against the brake body with the contact pressure that is exerted by the actuating device. The vehicle brake of the invention thus has the advantage that it has a self-boosting in one direction of rotation of the brake body while in the other direction of rotation it is neutral in terms of self-help.

A travel limiter for the friction brake lining of the vehicle brake of the invention limits a displacement travel of the friction brake lining in an opposite direction, that is, in the direction of rotation of the brake body in which the self-boosting device is not operative. In comparison to vehicle brakes that have a separate wedge mechanism for each direction of rotation of the brake body to attain self-boosting, the vehicle brake of the invention has the advantage of a simpler construction. Another advantage is that an actuation direction is always the same and is independent of a direction of rotation of the brake body. The invention furthermore has the advantage that when used as a parking brake, it is neutral in terms of self-help.

According to one embodiment, the actuating device acts on the friction brake lining indirectly via the wedge; that is, for actuating the vehicle brake, the wedge is displaced. This has the advantage that the actuation direction is independent of a direction of rotation of the brake body.

A wear compensating device may be used, providing the advantage that an actuation and displacement travel of the wedge and of the friction brake lining are not made longer from wear of the friction brake lining.

BRIEF DESCRIPTION OF THE DRAWING

The invention is described below in detail herein below in conjunction with the drawings, in which.

DESCRIPTION OF THE PREFERRED EMBODIMENTS

Figure 1:
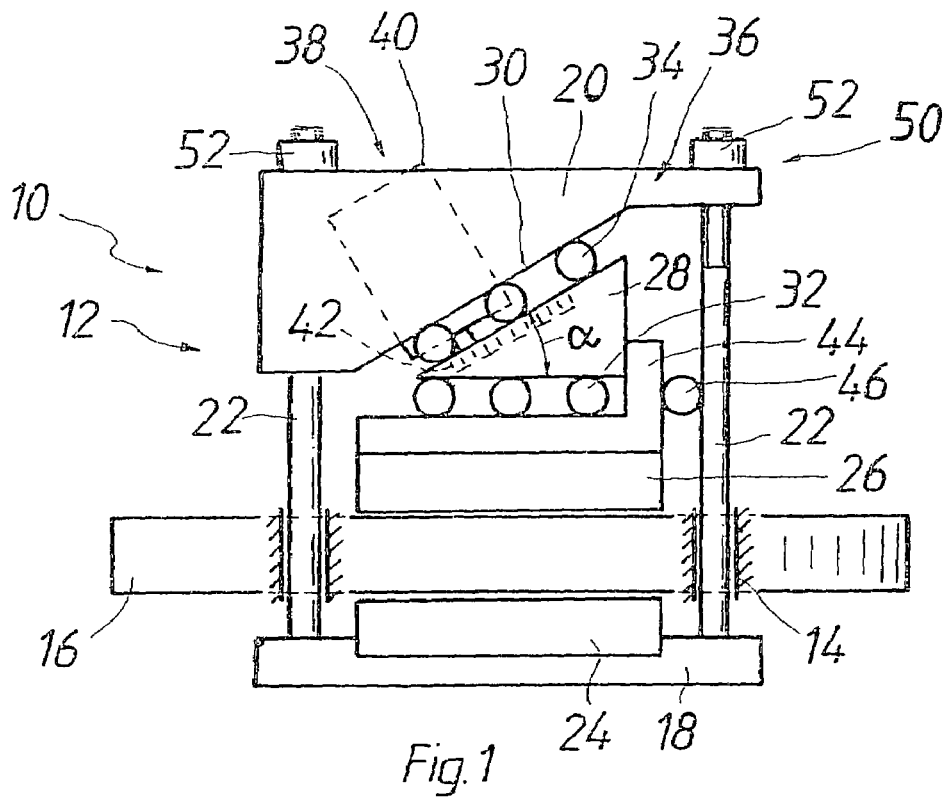
FIG. 1 is a simplified schematic view of a vehicle brake of the invention in its unactuated state, looking radially to an imaginary axis of rotation of a brake disk.

The vehicle brake of the invention shown in FIG. 1 is embodied as a disk brake 10. It has a brake caliper 12, which is embodied as a floating caliper; that is, it is guided displaceably in sliding guides 14 transversely to a brake disk 16. The brake disk 16 forms a brake body that can be braked by the vehicle brake/disk brake 10. At the same time, the brake caliper 12 is embodied as a frame caliper, with two brake lining mounting plates 18, 20, which are located one on either side of the brake disk 16 and which are joined to one another outside the brake disk 16 by two tie rods 22.

Two friction brake linings 24, 26 rest in the brake caliper 12. One friction brake lining 24 is disposed fixedly, i.e., immovably, on a side of one of the two brake lining mounting plates 18 facing toward the brake disk 16. The other—movable—friction brake lining 26 is movable parallel and transversely to the brake disk 16; it is located in the brake caliper 12 on a diametrically opposite side of the brake disk 16 from where the fixed friction brake lining 24 is located.

A wedge 28 is located on a side, facing away from the brake disk 16, of the movable friction brake lining 26 and is displaceable relative to the movable friction brake lining 26 and relative to the brake caliper 12. On a side facing toward the wedge 28, the brake lining mounting plate 20 has an oblique face 30, which forms an abutment for the wedge 28. The oblique face 30 extends at an angle obliquely to the brake disk 16 that corresponds to a wedge angle α of the wedge 28. The wedge 28 is displaceably along the oblique face 30. To reduce friction, cylindrical roller bodies 32, 34 are located both between the wedge 28 and the movable friction brake lining 26 and between the wedge 28 and the oblique face 30, forming the abutment, of the brake caliper 12. If the movable friction brake lining 26 is pressed for braking against the brake disk 16, it is braced via the roller bodies 32, the wedge 28, and the roller bodies 34 on the oblique face 30 of the brake caliper 12. The wedge 28 and the oblique face 30 form a wedge mechanism 28, 30 and a mechanical self-boosting device 36, whose mode of operation will be further described hereinafter.

For actuation, the disk brake 10 has an electromechanical actuating device 38 with an electric motor 40, with which a gear wheel, not visible in the drawing, can be driven to rotate; the gear wheel meshes with the rack 42 of the wedge 28. The electric motor 40 is largely concealed by the brake lining mounting plate 20, and the rack 42 is concealed by the wedge 28, and these are therefore drawing in dashed lines. The rack 42 extends parallel to a side of the wedge 28 facing toward the oblique face 30 and thus extends parallel to the oblique face 30. A drive of the wedge 28 acts parallel to the oblique face 30.

The movable friction brake lining 26 has a slaving device 44 for the wedge 28, and this slaving device protrudes from a side, facing away from the brake disk 16, of the friction brake lining 26. The slaving device 44 causes the wedge 28 to be slaved to the movable friction brake lining 26 in one direction, while conversely in the opposite direction a relative motion is possible between the movable friction brake lining 26 and the wedge 28. The slaving device 44 moves the wedge 28 in the direction in which the wedge 28 moves along the oblique face 30 obliquely toward the brake disk 16.

The disk brake 10 also has a travel limiter 46, which limits a motion of the movable friction brake lining 26 in one direction. In the exemplary embodiment shown, the travel limiter 46 is formed by a cylindrical roller body 46, which is braced on the brake caliper 12, for instance on one of the two tie rods 22. The roller body serves to reduce friction upon a motion of the movable friction brake lining 26 transversely to the brake disk 16. The travel limiter 46 limits a displacement of the movable friction brake lining 26 in the direction in which the oblique face 40 of the brake caliper 12 becomes more distant from the brake disk 16.

Figure 2:
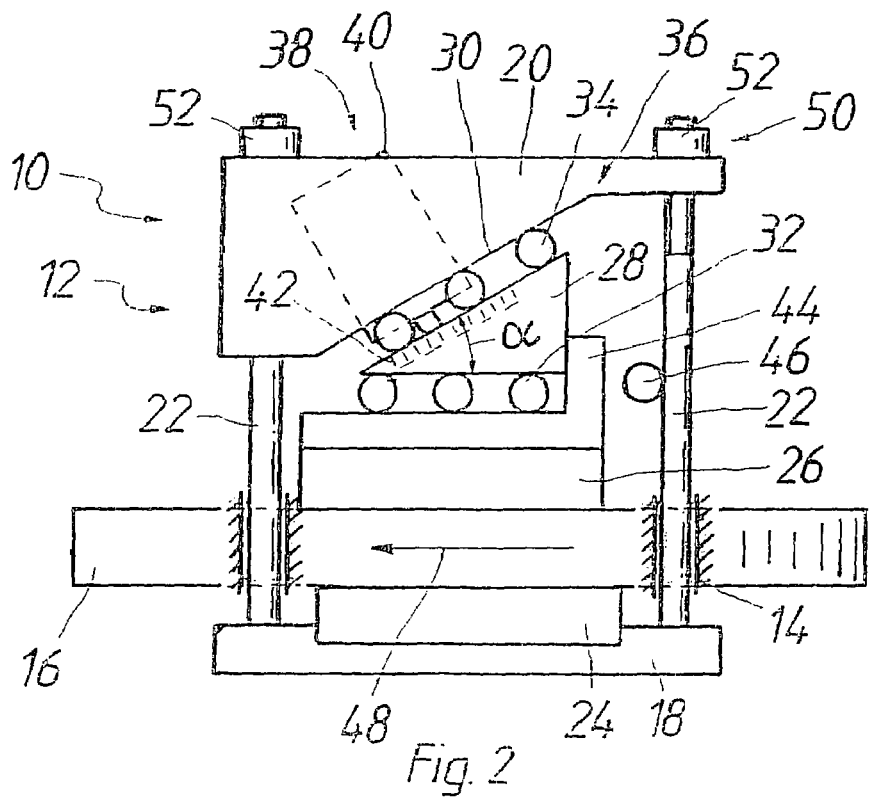
FIG. 2 shows the vehicle brake of FIG. 1 in its actuated state.

The function of the disk brake 10 of the invention will now be explained in terms of FIG. 2; it is assumed that the brake disk 16 is rotating in the direction of the arrow 48, or in other words to the left in terms of the drawing. For actuating the disk brake 10, the wedge 28 is displaced parallel to the oblique face 30 and obliquely toward the brake disk 16; given the assumed direction of rotation 48 of the brake disk 16 to the left, the wedge 28 is likewise displaced to the left. The movable friction brake lining 26 lifted from the travel limiter 46 in the process. Since the wedge 28 is moving obliquely toward the brake disk 16, it presses the movable friction brake lining 26 against the brake disk 16. Because of the pressing of the movable friction brake lining 26 against the brake disk 16, the brake caliper 12, embodied as a floating caliper, is displaced in a manner known per se in its guides 14 transversely to the brake disk 16 and presses the fixed friction brake lining 24 against the diametrically opposite side of the brake disk 16. The brake disk 16 is braked.

The rotating brake disk 16 exerts a frictional force on the movable friction brake lining 26, and this force urges and displaces it in the direction of a narrowing wedge gap between the oblique face 30 and the brake disk 16. Via the slaving device 44, the movable friction brake lining 26 likewise urges the wedge 28 in the direction of the narrowing wedge gap between the oblique face 3 and the brake disk 16. Because of its being braced on the oblique face 30 that forces the abutment, the wedge 28, in accordance with the principle of a wedge, exerts a force on the movable friction brake lining 26 that has a force component transversely to the brake disk 16. This force component that is transverse to the brake disk 16 is part of a contact pressure, which is generated in part by the action of the actuating device 38 on the wedge 28 and in part by the action on the movable friction brake lining 26 by the slaving device 44. The wedge mechanism that has the wedge 28 and the oblique face 30 thus converts the frictional force, exerted by the rotating brake disk 16 on the friction brake lining 26 pressed against it, into a contact pressure, which presses the friction brake lining 26 against the brake disk 16. The wedge mechanism thus forms the aforementioned self-boosting device 36, which generates some of the contact pressure required for braking from the frictional force between the rotating brake disk 16 and the friction brake lining 26 pressed against it and boosts a contact pressure exerted by the actuating device 38.

Figure 3:
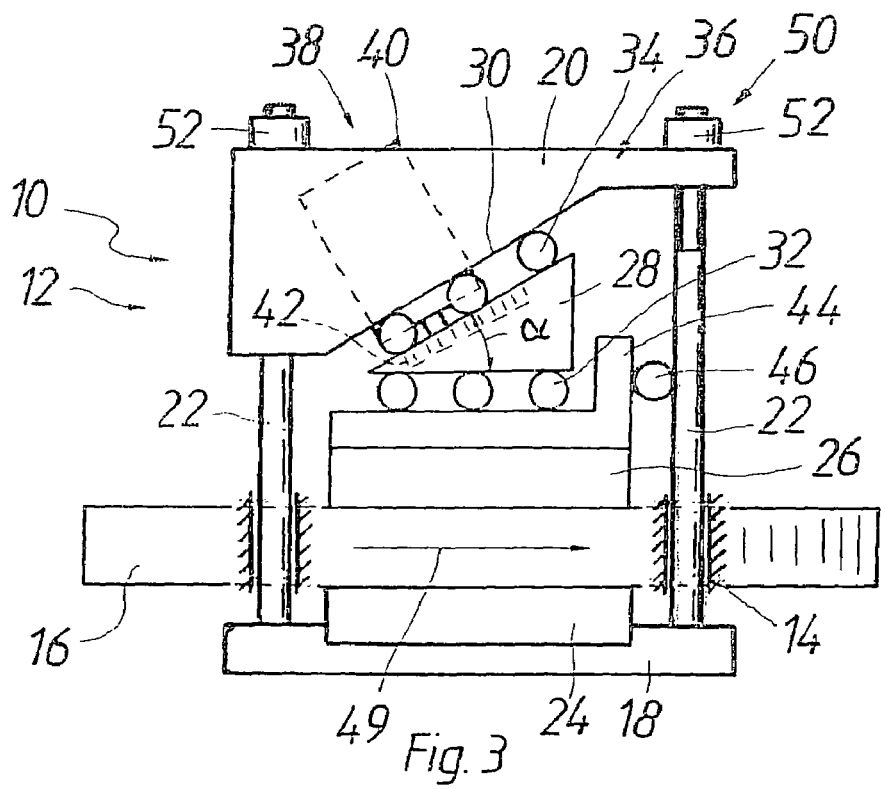
FIG. 3 shows the vehicle brake of FIG. 1 in its actuated state with the reverse direction of rotation of the brake disk.

The actuation of the disk brake 10 in the reverse direction of rotation 49 of the brake disk 16 is shown in FIG. 3. Here once again the movable friction brake lining 26 is pressed against the brake disk 16 by displacement of the wedge 28 in the direction of the narrowing wedge gap between the oblique face 30 and the brake disk 16. The direction of displacement of the wedge 28 for actuation of the disk brake 10 is independent of the direction of rotation of the brake disk 16 and the displacement is always effected in the same direction. A frictional force exerted by the rotating brake disk 16 on the movable friction brake lining 26 pressed against it now urges the friction brake lining 26 in the direction of the widening wedge gap between the oblique face 30 and the brake disk 16 and presses the friction brake lining 26 against the travel limiter 46. The wedge 28 moves away from the slaving device 44; it is decoupled from the frictional force exerted by the rotating brake disk 16 on the movable friction brake lining 26. The contact pressure of the friction brake lining 26 against the brake disk 16 is brought about solely by the actuating device 38 via the wedge 28; neither self-boosting nor self-fading occurs by means of the self-boosting device 36 or the wedge mechanism. In the direction of rotation 49 of the brake disk 16 as shown in FIG. 3, the disk brake 10 is accordingly neutral in terms of self-help. When the brake disk 16 is standing still as well, conditions are equivalent to those explained above in conjunction with FIG. 3; neither self-boosting nor self-fading occurs. This is important when the disk brake 10 is used not only as a service brake but also as a parking brake for implementing a parking brake function.

To avoid lengthening the displacement travels of the wedge 28 and the movable friction brake lining 26 when wear of the friction brake linings 24, 26 occurs, or in any case to limit such lengthening, the disk brake 10 of the invention has a wear readjusting device 50. With the wear readjusting or compensating device 50, an inside diameter of the brake caliper 12, or in other words a spacing of the two brake lining mounting plates 18, 20 from one another, can be varied. To that end, the tie rods 22 are mounted fixedly in one of the brake lining mounting plates, while conversely the other brake lining mounting plate 20 is displaceable on the tie rods 22. The tie rods 22 pass through the displaceable brake lining mounting plate 20 and protrude from the brake lining mounting plate 20 on the side facing away from the brake disk 16. Nuts 52 are screwed onto the protruding ends of the tie rods 22. By synchronized rotation of the nuts 52, the brake lining mounting plate 20 can be displaced parallel to the other brake lining mounting plate 18 and an inside diameter of the brake caliper 12 can be set. This makes it possible to compensate for wear of the friction brake linings 24, 26.

Figure 4:
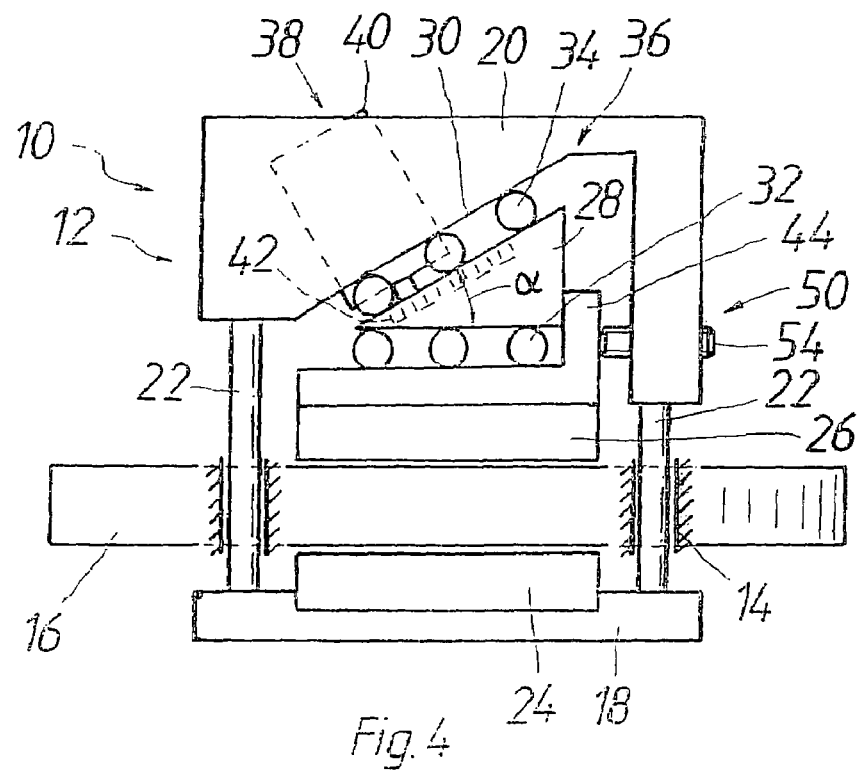
FIG. 4 shows a modified embodiment of the vehicle brake of FIG. 1 of the invention.

Another possibility for wear readjustment is shown in FIG. 4. Here the travel limiter that limits the displacement of the movable friction brake lining 26 in one direction has a set screw 54. By rotation of the set screw 54, wear of the friction brake linings 24, 26 can be compensated for. In this case, the brake caliper 12 is rigid, and its inside diameter is not adjustable. Otherwise, the disk brake 10 shown in FIG. 4 is embodied identically to the disk brake 10 shown in FIGS. 1-3 and functions in the same way. Components that match one another are identified by the same reference numerals; to avoid repetition, for an explanation of FIG. 4 see the explanations of FIGS. 1-3.

Preferably, instead of the simple wear compensating devices 50 shown and described, automatic wear readjustment devices are provided, which may be provided with their own actuating drives or which derive the energy needed for their adjustment from the motion of the wedge 28 and/or of the movable friction brake lining 26 (this option is not shown).

Figure 5:
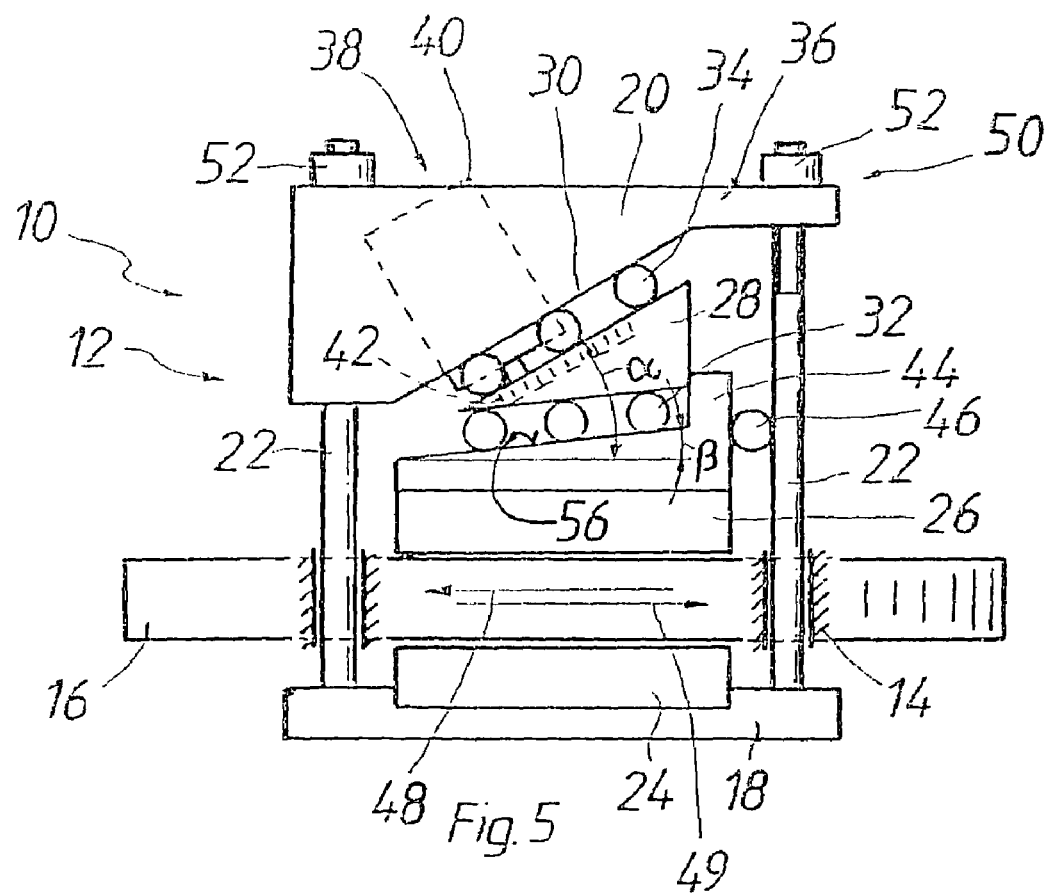
FIG. 5 is a further modification of the vehicle brake of FIG. 1 of the invention.

In the disk brake 10 shown in FIG. 5, the wedge 28 has a second wedge face 56, which extends at a wedge angle $\beta$ to the brake disk 16. The second wedge face 56 is oriented toward the brake disk 16, and the movable friction brake lining 26 is braced on it. The second wedge face 56 extends in the same direction, obliquely to the brake disk 16, as the oblique face 30 on which the wedge 28 is braced. However, the second wedge face 56 has a more-acute wedge angle $\beta$ than the oblique face 30. The wedge angle $\alpha$ should be seen as the angle between the oblique face 30 and the brake disk 16. The wedge 28 with the second wedge face 56 brings about a force boost upon actuation of the disk brake 10 when the brake disk 16 standing still and also when the brake disk 16 is rotating in the direction of rotation indicated by the arrow 49, in which the self-boosting is not operative, and instead the disk brake 10 is operating in a way that is neutral in terms of self-help. This has the advantage that the actuation force is less both when the vehicle is stopped, or in other words in the parking brake function, and in the direction of rotation 49 of the brake disk 16, when the system is neutral in terms of self-help. In the reverse direction of rotation 48 of the brake disk 16, in which the self-boosting is operative, the function of the disk brake 10 shown in FIG. 5 is identical to that explained above in conjunction with FIGS. 1 and 2; the constructions of the disk brakes 10 shown in FIGS. 1-5 are also the same, except for the second wedge face 56.

The foregoing relates to a preferred exemplary embodiment of the invention, it being understood the other variants and embodiments thereof are possible within the spirit and scope of the invention, the latter being defined by the appended claims.

The invention claimed is:

1. In a self boosting electromechanical vehicle brake, having a friction brake lining which is movable in one direction of rotation of a brake body that can be braked with the vehicle brake, having an electromechanical actuating device with which the friction brake lining can be pressed against the brake body for braking, and having a mechanical self-boosting device which has a wedge and an abutment for the wedge and is operative in one direction of rotation of the brake body and which converts a frictional force, exerted on the friction brake lining by the rotating brake body upon braking, into a contact pressure that presses the friction brake lining against the brake body, and the wedge is urged in the direction of rotation of the brake body by the frictional force exerted on the friction brake lining by the rotating brake body upon braking and, by being braced on the abutment because of a wedge effect brought about by the contact pressure on the friction brake lining, the improvement wherein the friction brake lining further comprises a slaving device for the wedge, which slaving device slaves the wedge to the friction brake lining in the one direction of rotation of the brake body in which the self-boosting device is operative; and wherein roller bodies are disposed between the slaving device and the wedge; and wherein the vehicle brake comprises a travel limiter for the friction brake lining, which limits a travel of the friction brake lining in the opposite direction.

2. The self-boosting electromechanical vehicle brake in accordance with claim 1, wherein that the vehicle brake is a disk brake.

3. The self-boosting electromechanical vehicle brake in accordance with claim 1, wherein the actuating device acts on the friction brake lining indirectly via the wedge.

4. The self-boosting electromechanical vehicle brake in accordance with claim 1, wherein the vehicle brake comprises a wear compensating device, which limits a displacement travel of the slaving device.

5. In a self-boosting electromechanical vehicle brake, having a friction brake lining which is movable in one direction of rotation of a brake body that can be braked with the vehicle brake, having an electromechanical actuating device with which the friction brake lining can be pressed against the brake body for braking, and having a mechanical self-boosting device which has a wedge and an abutment for the wedge and is operative in one direction of rotation of the brake body and which converts a frictional force, exerted on the friction brake lining by the rotating brake body upon braking, into a contact pressure that presses the friction brake lining against the brake body, and the wedge is urged in the direction of rotation of the brake body by the frictional force exerted on the friction brake lining by the rotating brake body upon braking and, by being braced on the abutment because of a wedge effect brought about by the contact pressure on the friction brake lining, the improvement wherein the friction brake lining further comprises a slaving device for the wedge, which slaving device slaves the wedge to the friction brake lining in the one direction of rotation of the brake body in which the self-boosting device is operative; wherein the vehicle brake comprises a travel limiter for the friction brake lining, which limits a travel of the friction brake lining in the opposite direction; wherein the vehicle brake comprises a wear compensating device, which limits a displacement travel of the slaving device; and wherein the vehicle brake is a disk brake with a brake caliper, whose inside diameter is adjustable for wear compensation.

6. In a self-boosting electromechanical vehicle brake, having a friction brake lining which is movable in one direction of rotation of a brake body that can be braked with the vehicle brake, having an electromechanical actuating device with which the friction brake lining can be pressed against the brake body for braking, and having a mechanical self-boosting device which has a wedge and an abutment for the wedge and is operative in one direction of rotation of the brake body and which converts a frictional force, exerted on the friction brake lining by the rotating brake body upon braking, into a contact pressure that presses the friction brake lining against the brake body, and the wedge is urged in the direction of rotation of the brake body by the frictional force exerted on the friction brake lining by the rotating brake body upon braking and, by being braced on the abutment because of a wedge effect brought about by the contact pressure on the friction brake lining, the improvement wherein the friction brake lining further comprises a slaving device for the wedge, which slaving device slaves the wedge to the friction brake lining in the one direction of rotation of the brake body in which the self-boosting device is operative; wherein the vehicle brake comprises a travel limiter for the friction brake lining, which limits a travel of the friction brake lining in the opposite direction; wherein the vehicle brake comprises a wear compensating device, which limits a displacement travel of the slaving device; and wherein the travel limiter for the friction brake lining is adjustable for wear compensation in and/or counter to the direction of rotation of the brake body.

7. In a self-boosting electromechanical vehicle brake, having a friction brake lining which is movable in one direction of rotation of a brake body that can be braked with the vehicle brake, having an electromechanical actuating device with which the friction brake lining can be pressed against the brake body for braking, and having a mechanical self-boosting device which has a wedge and an abutment for the wedge and is operative in one direction of rotation of the brake body and which converts a frictional force, exerted on the friction brake lining by the rotating brake body upon braking, into a contact pressure that presses the friction brake lining against the brake body, and the wedge is urged in the direction of rotation of the brake body by the frictional force exerted on the friction brake lining by the rotating brake body upon braking and, by being braced on the abutment because of a wedge effect brought about by the contact pressure on the friction brake lining, the improvement wherein the friction brake lining further comprises a slaving device for the wedge, which slaving device slaves the wedge to the friction brake lining in the one direction of rotation of the brake body in which the self-boosting device is operative; wherein the vehicle brake comprises a travel limiter for the friction brake lining, which limits a travel of the friction brake lining in the opposite direction; and wherein the wedge comprises a second wedge having a face, on which the friction brake lining is braced.

* * * * *

UNITED STATES PATENT AND TRADEMARK OFFICE
CERTIFICATE OF CORRECTION

PATENT NO. : 7,588,128 B2 Page 1 of 1
APPLICATION NO. : 10/581414
DATED : September 15, 2009
INVENTOR(S) : Baumann et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 457 days.

Signed and Sealed this

Twenty-first Day of September, 2010

David J. Kappos
*Director of the United States Patent and Trademark Office*